United States Patent [19]

Keller

[11] Patent Number: 5,132,396
[45] Date of Patent: Jul. 21, 1992

[54] PHTHALONITRILE MONOMERS CONTAINING IMIDE AND/OR PHENOXY LINKAGES, AND POLYMERS THEREOF

[75] Inventor: Teddy M. Keller, Alexandria, Va.

[73] Assignee: The United States of America as represented by the Secretary of the Navy, Washington, D.C.

[21] Appl. No.: 516,956

[22] Filed: Apr. 30, 1990

[51] Int. Cl.$^5$ .................. C08G 69/26; C08G 73/10
[52] U.S. Cl. ...................... 528/353; 528/322; 528/362; 548/433
[58] Field of Search .............. 548/433; 528/322, 362, 528/353

[56] References Cited

U.S. PATENT DOCUMENTS

| | | | |
|---|---|---|---|
| 3,093,656 | 6/1963 | Dreher et al. | 260/326 |
| 3,927,027 | 12/1975 | Jones et al. | 260/326 S |
| 3,996,196 | 12/1976 | D'Alello | 260/47 CP |
| 4,223,123 | 9/1980 | Keller et al. | 528/210 |
| 4,226,801 | 10/1980 | Keller et al. | 260/465 F |
| 4,234,712 | 11/1980 | Keller et al. | 528/9 |
| 4,238,601 | 12/1980 | Keller et al. | 528/206 |
| 4,244,857 | 1/1981 | Serafini et al. | 260/37 EP |
| 4,259,471 | 3/1981 | Keller et al. | 528/9 |
| 4,408,035 | 10/1983 | Keller | 528/183 |
| 4,409,382 | 10/1983 | Keller | 528/173 |
| 4,435,323 | 3/1984 | D'Alelio et al. | 548/473 |
| 4,499,260 | 2/1985 | Achar et al. | 528/229 |
| 4,587,325 | 5/1986 | Keller | 528/172 |
| 4,752,636 | 6/1988 | Treybig | 528/322 |
| 5,003,078 | 3/1991 | Keller | 548/406 |

FOREIGN PATENT DOCUMENTS

| | | | |
|---|---|---|---|
| 40-9018 | 5/1965 | Japan | 548/461 |
| 150283 | 6/1988 | Japan | 548/433 |
| 322342 | 2/1972 | U.S.S.R. | 548/461 |
| 1214642 | 2/1970 | United Kingdom | 548/423 |
| 2030983 | 4/1980 | United Kingdom | 548/418 |

OTHER PUBLICATIONS

Keller et al. "Amine-Cured Bisphenol-Linked Phthalonitrile Resins", printed in J. Macromol. Sci.-Chem. A18(6), pp. 931-937 (1982).

Keller et al. "Polymerization of Polysulphone Phthalonitriles", printed Polymer Communications, vol. 26, Feb. 1985, pp. 48-50.

Keller et al. "High Temperature Intrinsically Conductive Polymer", printed in Polymer Communications, vol. 28, 1987, Dec. pp. 334-336.

Keller "High Temperature Imide-Containing Phthalonitrile Resin", printed in Polymeric Materials Science and Engineering, vol. 58, 1988, pp. 1039-1041.

*Primary Examiner*—John Kight, III
*Assistant Examiner*—T. Mosley
*Attorney, Agent, or Firm*—Thomas E. McDonnell; Barry A. Edelberg

[57] ABSTRACT

Highly aromatic oligomeric imide-containing phthalonitriles are prepared by reacting an aromatic dianhydride with an aromatic or aliphatic diamine and endcapping the resulting reaction product with 4-aminophthalonitrile. The prepolymers are highly stable to storage. When heated above their melting or softening points, they polymerize to a thermosetting polymeric material useful as an advanced matrix material. In the case where the oligomeric monomers are produced by reacting dianhydrides with aromatic diamines, they polymerize to form high-temperature adhesives.

28 Claims, No Drawings

PHTHALONITRILE MONOMERS CONTAINING IMIDE AND/OR PHENOXY LINKAGES, AND POLYMERS THEREOF

BACKGROUND OF THE INVENTION

1. Field of the Invention

This invention relates, in general, to high-temperature materials and, in particular, to a new class of aromatic phthalonitrile monomers containing multiple imide linkages and their conversion to high-temperature thermosetting polymers and the synthesis thereof.

2. Description of the Prior Art

Polyimides, because of their outstanding thermal stability, have been favored for use in advanced engineering structures. In the past, polyimides were difficult to fabricate because of their insolubility in most of the more common solvents. The solubility problem was partially solved by using a poly(amic)-acid intermediate for product fabrication. During the final fabrication steps, imidization of the poly(amic)-acid is easily accomplished to give the desired end product. While this solved the solubility problem, it did not successfully solve a void problem caused by water liberated during imidization when the poly(amic)-acid was cured. The presence of voids in the final product is very undesirable because they reduce the mechanical properties of the product. The void problem can be solved by the development of fully imidized containing monomers or prepolymers, which have reactive end groups for polymerization purposes (see Keller, U.S. patent application Ser. No. 07/352,327, filed May 16, 1989, incorporated herein by reference). In this way, the water of imidization is removed before cure of the prepolymer. Although this substantially solved the void problem, other undesirable characteristics were still present, such as the existence of thermally unstable aliphatic crosslinking centers.

Phthalonitrile polymers constitute a recent and important class of high-temperature materials, having a wide range of uses, such as composite matrices, adhesives, sealants, and even semiconductors. These polymers are prepared from phthalonitriles in which the linking group between the two ortho dinitrile groups separates the dinitrile groups enough to permit polymerization. Presently several bridging groups are known. Examples include aliphatic and unsaturated groups, aromatic groups, aliphatic and aromatic diamide groups, and aliphatic and aromatic ether, sulfone and ketone groups.

SUMMARY OF THE INVENTION

Accordingly, an object of this invention is to synthesize phthalonitrile monomers, polymers and copolymers with excellent thermal and oxidative properties and good mechanical properties in excess of 300° C.

And, an object of this invention is to produce polymeric materials for composite matrices to be used in applications where the use temperature is above the operating temperature for conventional high-temperature polymers and below the operating temperature for ceramics or metals.

Also, an object of this invention is to produce polymeric material which are free of voids.

Further, an object of this invention is to provide new type of phthalonitrile resins having aromatic imide and ether linkages in the bridge connecting the terminal phthalonitrile polymerizable units.

Additionally, an object of this invention is to provide a resin which is more resistant to oxidative attack than epoxies, bismaleimides and other conventional thermosetting polyimides.

These and other objects are accomplished by reacting an organic diamine with an aromatic dianhydride followed by end capping with 4-aminophthalonitrile to produce an amic acid linked phthalonitrile which can be imidized either by chemical and/or thermal means. The resulting phthalonitrile is processed either alone or in the presence of a bisphenol-based phthalonitrile which behaves as a reactive plasticizer. Polymerization of the neat monomer or monomeric blend is achieved by heating above the melting point or softening temperature in the absence or presence of aromatic di- or polyamines, metals, and/or metallic salts.

DESCRIPTION OF THE PREFERRED EMBODIMENTS

The imide-containing phthalonitrile monomers of this invention are represented by the formula:

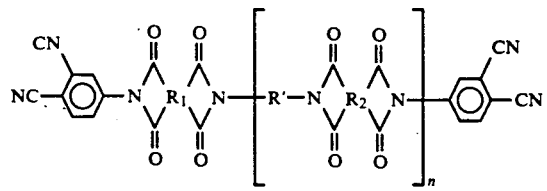

where n is an integer having a value of at least one and R' is any aromatic or aliphatic divalent organic radical (preferably aromatic). When R' is aliphatic, it is preferably $C_2$–$C_{30}$, more preferably $C_3$–$C_{30}$, and most preferably $C_3$–$C_{20}$. Moieties $R_1$ and $R_2$ can each be an aromatic tetravalent radical or substituted aromatic tetravalent radical, and can be the same or different. By the word "substituted", it is meant in this application that any known substituent could be attached to the aromatic moiety. Substituents include but are not limited to halogens, chalcogens and organic radicals, such as phenyl, hydroxyl, carboxyl, carbonyl or aliphatic groups of less than 10 carbon atoms. The preferred compounds are where $R_1$ and $R_2$ are independently selected from aromatic tetravalent radicals of the general formula:

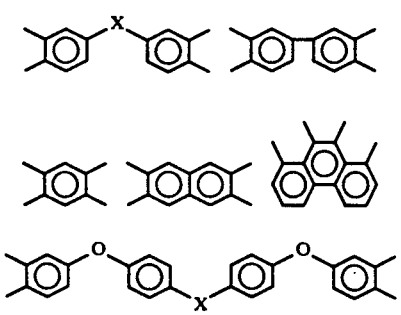

where X is

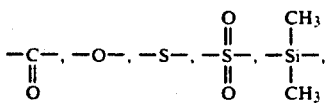

any alkyl of six carbons or fewer or any partially or perhalogenated or partially or perfluorinated alkyl of six carbons or fewer.

The most preferred compounds are where $R_1$ and $R_2$, independently of each other, represent aromatic tetravalent radicals of the general formula:

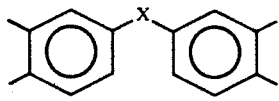

where X is

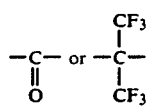

The value for n has no upper limit. However, as the value of n increases, the extent of crosslinking during curing decreases. Preferably, n has a value of from 1 to 5. The value of n may be predictably varied during synthesis by varying the ratios of the reactants.

The imide-containing monomers are produced by reacting aromatic dianhydrides with at least one aromatic or aliphatic diamine and end capping with 4-aminophthalonitrile and imidizing the end-capped product. The use of an aromatic diamine provides monomers which can be polymerized to obtain polymers with excellent thermal stability. The reaction may be performed in most dipolar aprotic solvents, such as dimethyl sulfoxide (DMSO), dimethylacetamide (DMAC), N-methylpyrrolidone (NMP) and dimethylformamide (DMF). The phthalonitrile monomers may be prepared in situ in one step or the diamine and aromatic anhydride may be reacted and the resulting product later endcapped with 4-aminophthalonitrile.

In one exemplary process, the oligomeric imide-containing phthalonitrile monomers prepared in accordance with the present invention are prepared in solution by reacting organic dianhydrides, organic diamine, and 4-aminophthalonitrile in various stoichiometric concentrations. The average molecular weight can be varied as a function of the quantity of the individual reactant compounds used. The reaction is performed stepwise in the same reaction vessel. Initially, the organic dianhydride and organic diamine are mixed into a dipolar aprotic solvent, e.g., dimethylacetamide (DMAC) and dimethylformamide (DMF), and allowed to react between 25° and 110° C. to form the amic acid linkage. In all cases, an excess amount of organic dianhydride is used. The end-capped anhydride moieties are then reacted with 4-aminophthalonitrile to yield the oligomeric amic acid-terminated phthalonitrile monomers. To the amic acid medium is added toluene as an azeotropic solvent. The water which is formed as a by-product during the imidization reaction is removed by azeotropic distillation using a Dean-Stark trap. The imidization reaction was monitored by FTIR spectroscopy and by observing the cessation of water formation. At this time, the reaction content is poured into absolute ethanol and the precipitated product collected by suction filtration.

When the imide-containing phthalonitrile monomers are melted and heated above their melting or softening points in the presence or absence of organic nucleophilic agents (aromatic amines) or metallic salts, polymerization to thermosetting polymeric materials readily occurs. The cure time is greatly reduced in the presence of even a small amount of curing agent.

Examples of the preferred dianhydrides which are suitable for use in this invention are listed below:
 4,4'-(hexafluoroisopropylidene)diphthalic anhydride
 pyromellitic dianhydride
 3,3',4,4'-benzophenonetetracarboxylic dianhydride
 2,3,6,7-naphthalene tetracarboxylic dianhydride
 3,3',4,4'-diphenyl tetracarboxylic dianhydride
 1,3,5,6-naphthalene tetracarboxylic dianhydride
 2,2'3,3'-diphenyl tetracarboxylic dianhydride
 2,2-bis(3,4-dicarboxyphenyl)propane dianhydride
 bis(3,4-dicarboxyphenyl)ether dianhydride
 naphthalene-1,2,4,5-tetracarboxylic dianhydride
 naphthalene-1,4,5,8-tetracarboxylic dianhydride
 decahydronaphthalene-1,4,5,8-tetracarboxylic dianhydride
 4,8-dimethyl-1,2,3,5,6,7-hexahydronaphthalene-1,2,5,6-tetracarboxylic dianhydride
 2,6-dichloronaphthalene-1,4,5,8-tetracarboxylic dianhydride
 2,7-dichloronaphthalene-1,4,5,8-tetracarboxylic dianhydride
 2,3,6,7-tetrachloronaphthalene-1,4,5,8-tetracarboxylic dianhydride
 phenanthrene-1,8,9,10-tetracarboxylic dianhydride
 2,2-bis(2,3-dicarboxyphenyl)propane dianhydride
 1,1-bis(2,3-dicarboxyphenyl)ethane dianhydride
 1,1-bis(3,4-dicarboxyphenyl)ethane dianhydride
 bis(2,3-dicarboxyphenyl)methane dianhydride
 bis(3,4-dicarboxyphenyl)methane dianhydride
 bis(3,4-dicarboxyphenyl)sulfone dianhydride
 benzene-1,2,3,4-tetracarboxylic dianhydride
 4,4'-oxydiphthalic dianhydride
 4,4'-thiophthalic dianhydride
 bis(3,4-dicarboxyphenyl)dimethylsilane dianhydride
 4,4'-isophthaloyldiphthalic anhydride
 4,4'-bis(3,4-dicarboxyphenoxy)diphenylsulfide dianhydride The most preferred dianhydrides are 3,3',4,4'-benzophenonetetracarboxylic dianhydride and 4,4'-(hexafluoroisopropylidene)diphthalic anhydride.

The organic diamines preferred in this invention are given below:
 o-phenylenediamine
 m-phenylenediamine
 p-phenylenediamine
 4,4'-diaminodiphenylpropane
 4,4'-diaminodiphenylmethane (commonly named 4,4'-methylenedianiline)
 4,4'-diaminodiphenyl sulfide (commonly named 4,4'-thiodianiline)
 4,4'-diaminodiphenyl ether (commonly named 4,4'-oxydianiline)
 1,5-diaminonaphthalene
 3,3'-dimethylbenzidine
 3,3'-dimethoxybenzidine
 2,4-bis(β-amino-t-butyl)toluene
 bis(p-β-amino-t-butyl)ether
 bis(p-β-methyl-o-aminopentyl)benzene 1,3-diamino-4-isopropylbenzene
1,2-bis(3-aminopropoxy)ethane
benzidine
m-xylylenediamine
p-xylylenediamine
2,4-diaminotoluene
2,6-diaminotoluene
1,3-bis(3-aminophenoxy)benzene
1,3-bis(4-aminophenoxy)benzene
1,4-bis(3-aminophenoxy)benzene
1,4-bis(4-aminophenoxy)benzene
bis[4-(3-aminophenoxy)phenyl]sulfone
bis[4-(4-aminophenoxy)phenyl]sulfone
4,4'-bis(3-aminophenoxy)biphenyl
4,4'-bis(4-aminophenoxy)biphenyl
2,2-bis[4-(3-aminophenoxy)phenyl]propane
2,2-bis[4-(4-aminophenoxy)phenyl]propane
hexakis(4-aminophenoxy)cyclotriphosphazene If a curing agent is used, the curing agent can be any organic nucleophilic amine curing agent, diamine, polyamine or amine substituted phosphazene, including the diamines listed above, or may be a metal or metallic salt such as chromium, molybdenum, vanadium, beryllium, silver, mercury, aluminum, tin, lead, antimony, calcium, barium, manganese, magnesium, zinc, copper, iron, cobalt, nickel, palladium, platinum, cuprous chloride, cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and stannous chloride (2TPPO/SnCl$_2$) and mixtures thereof. The curing agents may be used in the same amounts as conventionally used in curing analogous prior art monomers.

Having described the invention, the following examples are given to illustrate specific applications of the invention including the best mode now known to perform the invention. These specific examples are not intended to limit the scope of the invention described in this application.

EXAMPLES

Example 1

To a 3-necked flask equipped with a thermometer and a Dean-Stark trap was added 0.91 g (3.11 mmol) of 1, 3-bis (3-aminophenoxy) benzene and 10 ml of dry dimethylformamide. The resulting 1 solution was purged with dry nitrogen for 30 minutes. At this time, 2.01 g (6.22 mmol) of benzophenonetetracarboxylic dianhydride was added in one portion resulting in a temperature rise to 35° C. After stirring at ambient conditions for hour, the reaction temperature was increased to 70° C. and held at this temperature for 2 hours. Upon cooling to room temperature, 0.89 g (6.22 mmol) of 4-aminophthalonitrile was added in one portion. The yellow solution was stirred at 25°–35° C. for 1 hour followed by increasing the reaction temperature to 70° C. and holding for 1 hour. At this time, the Dean-Stark trap was filled with toluene. Toluene (4 ml) was also added to the reaction vessel. The reaction content was then stirred at reflux (135°–145° C.) for 16 hours. Water, which was formed as a by-product, was removed by azeotropic distillation. The toluene was then removed by distillation. After cooling, the product mixture was poured into 50 ml of absolute ethanol. The white solid which separated was collected by suction filtration, washed with excess absolute ethanol, and dried to afford 3.4 g (96%) of oligomeric imide-containing phthalonitrile monomer. To ensure complete imidization conversion, the solid was heated at 300° C. for 1 hour resulting in the evolution of volatiles.

Example 2

Benzophenonetetracarboxylic dianhydride (4.0 g, 12.42 mmol) and 10 ml of dimethylformamide were added to a 50 ml, 3-necked flask followed by purging with dry nitrogen for 30 minutes. To the stirred solution was added 2.42 g (8.29 mmol) of 1, 3-bis (3-aminophenoxy) benzene in one portion resulting in an increased in the reaction temperature to 35° C. After stirring at ambient conditions for 1 hour, the reaction content was heated at 80° C. for 2 hours. Upon cooling to room temperature 1.18 g (8.28 mmol) of 4-aminophthalonitrile was added. An increase in the reaction temperature was not observed. The temperature was increased to 90° C. and the reaction content was stirred at this temperature for 2 hours. The Dean-Stark trap was filled with toluene. Toluene (4 ml) was also added to the reaction vessel. Water, which was formed as a by product, was removed by azeotropic distillation. Total reflux time was 16 hours. The reaction was monitored by Fourier Transform Infrared Spectroscopy (FTIR) and appeared to proceed to completion. Upon cooling, the product medium was poured into absolute ethanol resulting in the formation of a white precipitate. The product was collected by suction filtration, washed several times with absolute ethanol, and dried to afford 7.0 g (97%) of oligomeric imide-containing phthalonitrile monomer.

Example 3

To a 200 ml, 3-necked flask fitted with a Dean-Stark trap and a thermometer was added 20.10 g (45.05 mmol) 4, 4'(hexafluoroisopropylidene) and 50 ml of dry dimethylformamide. After purging the solution with nitrogen for 20 minutes, 6.58 g (22.52 mmol) of 1, 3 bis (3-aminophenoxy) benzene was slowly added over a 10 minute period. During the addition, the temperature rose to 45° C. and the resulting solution was stirred for 1 hour under ambient conditions. The temperature of the reaction mixture was then increased to 90° C. and held at this temperature for 1 hour. After cooling to room temperature, 6.44 g (45.05 mmol) of 4-aminophthalonitrile was added in one portion. The reaction medium was stirred under ambient conditions for 1 hour and at 90° C. for 1 hour. At this time, the Dean-Stark trap was filled with toluene. Toluene (6 ml) was also added to the reaction vessel. The reaction content was then stirred at reflux for 16 hours. Water, which was formed as a byproduct, was removed by azeotropic distillation. After removing the toluene by distillation and cooling, the product mixture was poured into 300 ml of absolute ethanol. The white solid which separated was collected by suction filtration, washed with excess 10 absolute ethanol, and dried to afford 26.8 g (93%) of oligomeric imide-containing phthalonitrile monomer.

Example 4

To a 200 ml, 3-necked flask fitted with a Dean-Stark trap and a thermometer was added 20.0 g (45.0 mmol)

of 4, 4'-(hexafluoroisopropylidene) diphthalic anhydride and 50 ml of dry dimethylformamide. After purging the stirred solution with nitrogen for 30 minutes, 6.61 g (22.5 mmol) of 1,4-bis(4-aminophenoxy)benzene was added over a period of 15 minutes resulting in a temperature rise to 45° C. After stirring for 1 hour under ambient conditions, the temperature of the reaction mixture was increased to 90° C. and held at this temperature for 1 hour. After cooling to room temperature, 6.41 g (45.0 mmol) of 4-aminophthalonitrile was added in one portion. The reaction medium was then stirred under ambient conditions for 1 hour and at 90° C. for 1 hour. The Dean-Stark trap was then filled with toluene. Toluene (6 ml) was also added to the reaction vessel. The reaction content was stirred at reflux for 12 hours and the water being formed as a by-product was removed by azeotropic distillation. After removing the toluene by distillation and cooling, the product mixture as poured into 400 ml of absolute ethanol. The white precipitate which separated was collected by suction filtration, washed with absolute ethanol, and dried to afford 28.1 g (97%) of oligomeric imide-containing phthalonitrile monomer.

Example 5

To a dry 100 ml, 3-necked flask equipped with a thermometer, a Dean-Stark trap, and a condenser was added 10.01 g (22.55 mmol) of 4, 4-(hexafluoroisopropylidene) diphthalic anhydride and 40 ml of dry dimethylformamide. After purging the stirred solution with nitrogen for 30 minutes, 4.38 g (15.00 mmol) of 1, 3-bis (3-aminophenoxy) benzene was added in one portion. After the addition, the temperature rose to 45° C. and the solution was stirred for 1 hour under ambient conditions. The temperature of the reaction medium was then increased to 90° C. and held at this temperature for 1 hours. After cooling to room temperature, 2.15 g (15.03 mmol) of 4-aminophthalonitrile was added in one portion. The reaction medium exothermed to 40° C. and was stirred for 1 hour under ambient conditions and at 90° C. for 1 hour. At this time, the Dean-Stark trap was filled with toluene. Toluene (5 ml) was also added to the reaction medium. The reaction medium was then stirred at reflux for 17 hours. Water, which was formed as a by-product, was removed by azeotropic distillation. After removing the toluene by distillation and cooling, the product mixture was poured into 150 ml of absolute ethanol. The white solid which separated was collected by suction filtration, washed several times with 100 ml portions of absolute ethanol, and dried to afford 13.3 g (85%) of oligomeric imide-containing phthalonitrile monomer.

Example 6

To a 50 ml, 3-necked flask equipped with a thermometer and a Dean-Stark trap was added 2.23 g (7.60 mmol) of 3, 3', 4, 4'-biphenyltetracarboxylic dianhydride and 20 ml of dry dimethylformamide. After purging the stirred solution with nitrogen for 30 minutes, 1.11 g (3.80 mmol) of 1, 3-bis (3-aminophenoxy) benzene was added in one portion. The resulting solution was stirred for 1 hour under ambient conditions. The temperature of the reaction mixture was then increased to 80° C. and held at this temperature for 1 hour. After cooling to room temperature, 1.09 g (7.62 mmol) of 4-aminophthalonitrile was added in one portion. The reaction medium was stirred under ambient conditions for 1 hour and at 90° C. for 1 hour. At this time, the Dean-Stark trap was filled with toluene. Toluene (4 ml) was also added to the reaction vessel. The reaction content was then stirred at reflux for 14 hours. Water formed as a by-product was removed by azeotropic distillation. After removing the toluene by distillation and cooling, the product mixture was poured into 100 ml of absolute ethanol. The white solid which separated was collected by suction filtration, washed with excess absolute ethanol, and dried to afford 3.5 g (95%) of oligomeric imide-containing phthalonitrile monomer.

Example 7

To a 100 ml, 3-necked flask equipped with a thermometer and a Dean-Stark trap was added 5.01 g (11.26 mmol) of 4,4'-hexafluoroisopropylidene)diphthalic anhydride and 15 ml of dry dimethylformamide. After purging the cloudy solution with nitrogen for 20 minutes, 1.64 g (5.64 mmol) of 1,3-bis(3-aminophenoxy)benzene and 1.61 g (11.28 mmol) of 4-aminophthalonitrile were mixed and added in one portion. The resulting mixture exothermed to approximately 32° C. and was stirred under ambient condition for 4 hours. At this time, the temperature of the reaction solution was increased to 80° C. and held at this temperature for 2 hours. The Dean-Stark trap was then filled with toluene. Excess toluene (20 ml) was added to the reaction vessel. The resulting solution was then heated at reflux for 6 hours to remove water formed as a by-product. Upon cooling, the product was precipitated into absolute ethanol. The white precipitate was collected by suction filtration, washed with excess absolute ethanol, and dried to afford 6.8 g (94%) of oligomeric imide-containing phthalonitrile monomer. The infrared spectrum was identical to that of the product from Example 3.

Example 8

The general neat polymerization of the oligomeric imide-containing phthalonitrile monomers is as follows: To the melt of the monomers, which had been degassed at 300°-340° C., was added 0-5% by weight of curing agent. The resulting viscous polymerization mixtures were cured by heating at 315° C. for 16-48 hours in an air atmosphere. The polymers were postcured up to 375° C. under an argon atmosphere to enhance the thermal properties.

Example 9

An enhancement in processability of oligomeric imide-containing phthalonitrile monomers was achieved by blending with bisphenol-based phthalonitrile monomers described as follows: The various oligomeric monomers are blended or mixed with various concentrations of bisphenol-based phthalonitrile monomers to reduce the viscosity and the processing temperature. To the melt of such a mixture that had been degassed between 250°-300° C. was added a curing additive, e.g. hexakis(4-aminophenoxy)cyclotriphosphazene, in 0-5% by weight quantities with stirring. Each blended sample was then cured by heating at 250°-270° C. for 2 hours and at 300°-315° C. for 16-49 hours in an air atmosphere. The polymeric blends were then postcured up to 375° under an argon atmosphere to optimize the physical properties.

Example 10

A 0.5 g sample of the oligomeric imide-containing phthalonitrile monomer produced in Example was placed in an aluminum planchet and degassed at reduced pressure in the melt at 315°–330° C. for 4 hours. At this time, 5 mg (1% by weight) of hexakis(4-aminophenoxy)cyclotriphosphazene was added with stirring. The resulting viscous mixture was cured by heating at 315° C. for 16 hours in air. the thermal and oxidative stability were enhanced by postcuring up to 375° C. under an argon atmosphere.

Example 11

To the melt (0.5 g) of oligomeric imide-containing phthalonitrile monomer produced in Example 3, which had been degassed at 320°–340° C., was added 5 mg of hexakis(4-aminophenoxy)-cyclotriphosphazene (1% by weight) with stirring. The resulting mixture was cured by heating at 315° C. for 16 hours in air. The polymer was then postcured at 350° C. for 12 hours under an argon atmosphere to enhance the thermal properties.

Example 12

To the melt (0.5 g) of oligomeric imide-containing phthalonitrile monomer produced in Example 4, which had been degassed at 320°–340° C., was added 7.5 mg of hexakis(4-aminophenoxy)cyclotriphosphazene (1.5% by weight) with stirring. The resulting mixture was cured by heating at 315° C. for 16 hours in air. Gelation occurred faster in Example 12 relative to Example 11 due to the use of a larger amount of curing agent. The polymer was further postcured at 350° C. for 4 hours and at 375° C. for 12 hours to improve the thermal properties.

Example 13

The oligomeric imide-containing monomer (0.5 g) produced in Example 3 and 0.1 g of 2, 2-bis[4-(3, 4-dicyanophenoxy)phenyl]hexafluoropropane were weighed into an aluminum planchet and degassed at reduced pressure between 260°–300° C. for 3 hours. To the resulting homogeneous blend, which was less viscous relative to the melt of the oligomeric monomer, at 300° C. was added 6 mg of hexakis(4-aminophenoxy)cyclotriphosphazene (1% by weight) with stirring. The blended sample was then cured by heating at 270° C. for 2 hours and at 315° C. for 16 hours in air. The resulting polymer was further postcured under an argon atmosphere at 350° C. for 2 hours and at 375° C. for 12 hours to enhance the thermal properties.

Example 14

The oligomeric imide-containing monomer (0.4 g) produced in Example 4 and 0.1 g of 2, 2-bis[4-(3, 4-dicyanophenoxy)phenyl]hexafluoropropane were weighed into an aluminum planchet and degassed at reduced pressure between 260°–300° C. for 3 hours. To the resulting homogeneous blend, which was less viscous relative to the melt of the oligomeric monomer, at 300° C. was added 10 mg of hexakis(4-aminophenoxy)-cyclotriphosphazene (2% by weight) with stirring. The blended sample was then cured by heating at 270° C. for 2 hours in air. The thermal properties were further enhanced by postcuring the sample under an argon atmosphere at 350° C. for 4 hours and at 375° C. for 8 hours.

Example 15

The oligomeric imide-containing monomer (0.7 g) produced in Example 3 and 0.3 g of 2, 2-bis[4-(3, 4-dicyanophenoxy)phenyl]hexafluoropropane were weighed into an aluminum planchet and degassed at reduced pressure for 2 hours at 300° C. To the resulting melt, which flowed easily at 280° C. was added 10 mg (1% by weight) of hexakis(4-aminophenoxy)cyclotriphosphazene with stirring. The resulting blended sample was cured by heating at 280° C. for 2 hours and at 315° C. for 12 hours in air. The cure sample was further postcured at 340° C. for 3 hours and at 375° C. for 12 hours.

Example 16

The oligomeric imide-containing monomer (0.6 g) produced in Example 4 and 0.4 g of 2, 2-bis[4-(3, 4-dicyanophenoxy)phenyl]hexafluoropropane were weighed into an aluminum planchet and degassed at reduced pressure at 260°–280° C. for one hour. To the melt at 260° C. was added 10 mg (1% by weight) of hexakis(4-aminophenoxy)cyclotriphosphazene with stirring. The resulting blended sample was cured by heating at 280° C. for 2 hours and at 315° C. for 16 hours in air. The cured sample was further postcured at 350° C. for 4 hours and at 375° C. for 14 hours.

Example 17

The oligomeric imide-containing monomer (0.25 g) produced in Example 3 and 0.25 g of 2, 2-bis[4-(3, 4-dicyanophenoxy)phenyl]-hexafluorophosphazene were weighed into an aluminum planchet and degassed at reduced pressure at 260° C. for 2 hours. to the melt at 260° C. was added 5 mg (1% by weight) of hexakis(4-aminophenoxy)-cyclotriphosphazene with stirring. The sample was then placed in an oven and cured by heating at 260° C. for 4 hours and at 315° C. for 16 hours in air. Thermal properties were enhanced by postcuring under an argon atmosphere at 350° C. for 4 hours and at 375° C. for 10 hours.

Example 18

The oligomeric imide-containing monomer (0.15 g) produced in Example 4 and 0.35 g of 2, 2-bis[4-(3, 5-dicyanophenoxy)phenyl]hexafluoropropane were weighed into an aluminum planchet and degassed at reduced pressure at 260° C. for 2 hours. To the melt at 260° C. was added 10 mg (2% by weight) of hexakis(4-aminophenoxy)-cyclotriphosphazene with stirring. The sample was then cured by heating at 260° C. for 8 hours and at 315° C. for 16 hours in air. The physical properties were enhanced by postcuring under an argon atmosphere at 350° C. for 6 hours and at 375° C. for 12 hours.

Example 19

The oligomeric imide-containing monomer (0.5 g) produced in Example 2 and 0.5 g of 4, 4'-bis(3, 4-dicyanophenoxy)biphenyl were weighed into an aluminum planchet and degassed at 270° C. for 3 hours at reduced pressure. To the resulting melt at 260° C. was added 10 mg of 1, 3-bis(3-aminophenoxy benzene with stirring. The resulting mixture was cured by heating at 260° C. for 4 hours and at 315° C. for 16 hours in air. The thermal properties were enhanced by postcuring at 350° C. for 4 hours and at 375° C. for 4 hours.

Obviously, many modifications and variations of the present invention are possible in light of the above teachings. It is therefore to be understood that, within the scope of the appended claims, the invention may be practiced otherwise than as specifically described.

What is claimed is:

1. An imide-containing phthalonitrile monomer having the following formula:

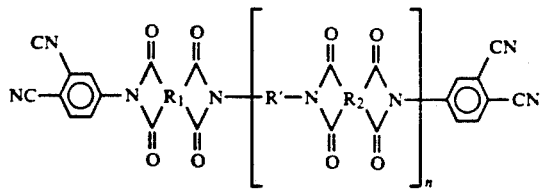

where n is an integer having a value of at least one, R' is a $C_3$–$C_{20}$ alkyl radical and $R_1$ and $R_2$ represent, independently of each other, an aromatic tetravalent radical or a substituted aromatic tetravalent radical.

2. The imide-containing phthalonitrile monomer of claim 1, wherein n has a value of from 1 to 5.

3. The imide-containing phthalonitrile monomer of claim 2, wherein R' is $C_3$–$C_{20}$ alkyl.

4. The imide-containing phthalonitrile monomer of claim 1, wherein $R_1$ and $R_2$ represent, independently of each other, a tetravalent aromatic radical substituted with a halogen, chalcogen, phenyl, hydroxyl, carboxyl, carbonyl, or aliphatic of less than 10 carbon atoms.

5. The imide-containing phthalonitrile monomer of claim 1, wherein $R_1$ and $R_2$ represent, independently of each other, a tetravalent radical of the formula:

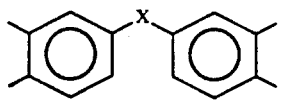

wherein X in at least one of $R_1$ and $R_2$ is partially or perfluorinated alkylene.

6. A thermosetting phthalonitrile polymer produced by: heating a mixture of:
(a) an imide-containing phthalonitrile monomer having the following formula:

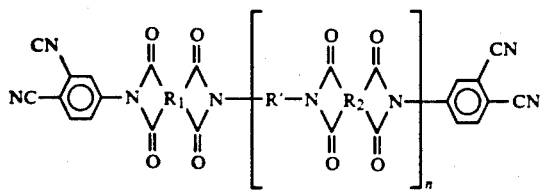

where n is an integer having a value of at least one, R' is an aliphatic or aromatic divalent radical and $R_1$ and $R_2$ represent, independently of each other, an aromatic tetravalent radical or a substituted aromatic tetravalent radical; and
(b) an amount of an organic nucleophilic amine curing agent effective to cure said imide-containing phthalonitrile monomer,
above its melting or softening point.

7. The thermosetting phthalonitrile polymer of claim 6, wherein n has a value of from 1 to 5.

8. The thermosetting phthalonitrile polymer of claim 7, wherein R' is $C_3$–$C_{20}$ alkyl.

9. The thermosetting phthalonitrile polymer of claim 6, wherein R' is aromatic.

10. The thermosetting phthalonitrile polymer of claim 6, wherein $R_1$ and $R_2$ represent, independently of each other, a tetravalent aromatic radical substituted with a halogen, chalcogen, phenyl, hydroxyl, carboxyl, carbonyl, or aliphatic of less than 10 carbon atoms.

11. The thermosetting phthalonitrile polymer of claim 6, wherein $R_1$ and $R_2$ are selected, independently of each other, from the group consisting of:

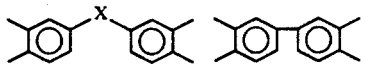

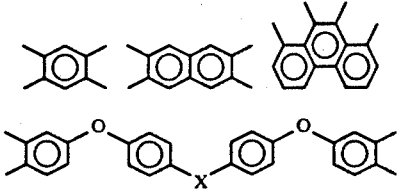

where X is

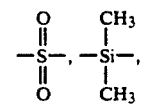

any alkyl of six carbons or fewer, any partially or perhalogenated alkyl of six carbons or fewer, or any partially or perfluorinated alkyl of six carbons or fewer.

12. The thermosetting phthalonitrile polymer of claim 11, wherein $R_1$ and $R_2$ represent, independently of each other, a tetravalent radical of the formula:

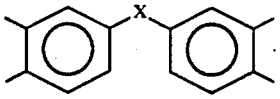

13. The thermosetting phthalonitrile polymer of claim 12, wherein at least one of $R_1$ and $R_2$ is partially or perfluorinated alkyl.

14. The thermosetting phthalonitrile polymer of claim 12, where X is

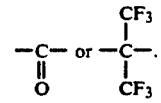

15. The thermosetting phthalonitrile polymer of claim 6, wherein said organic nucleophilic amine curing agent is a diamine, a polyamine or an amine substituted phosphazene.

16. The thermosetting phthalonitrile polymer of claim 15, wherein said organic nucleophilic amine curing agent is a diamine selected from the group consisting of:
o-phenylenediamine;
m-phenylenediamine;
p-phenylenediamine;
4,4'-diaminodiphenylpropane;

4,4'-diaminodiphenylmethane;
4,4'-diaminodiphenyl sulfide;
4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis(p-β-amino-t-butyl)ether;
bis(p-β-methyl-o-aminopentyl)benzene;
1,3-diamino-4-isopropylbenzene;
1,2-bis(3-aminopropoxy)ethane;
benzidine;
m-xylylenediamine;
p-xylylenediamine;
2,4-diaminotoluene;
2,6-diaminotoluene;
1,3-bis(3-aminophenoxy)benzene;
1,3bis(4aminophenoxy)benzene;
1,4-bis(3-aminophenoxy)benzene;
1,4-bis(4-aminophenoxy)benzene;
bis[4-(3-aminophenoxy)phenyl]sulfone;
bis [4-(4-aminophenoxy)phenyl]sulfone;
4,4'-bis(3-aminophenoxy)biphenyl;
4,4'-bis(4-aminophenoxy)biphenyl;
2,2-bis[4-(3-aminophenoxy)phenyl]propane;
hexakis(4-aminophenoxy)cyclotriphosphazene; and
2,2-bis[4-(4-aminophenoxy)phenyl]propane.

17. A polymerizable mixture comprising:
(a) an imide-containing phthalonitrile monomer having the following formula:

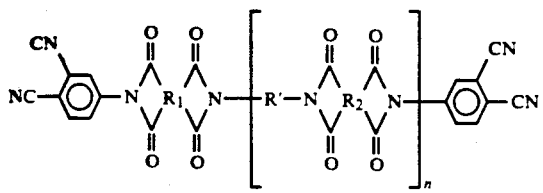

where n is an integer having a value of at least one, R' is an aliphatic or aromatic divalent radical and $R_1$ and $R_2$ represent, independently of each other, an aromatic tetravalent radical or a substituted aromatic tetravalent radical; and
(b) an amount of an organic nucleophilic amine curing agent effective to cure said imide-containing phthalonitrile monomer.

18. The polymerizable mixture of claim 17, wherein n has a value of from 1 to 5.

19. The polymerizable mixture of claim 18, wherein R' is $C_3$–$C_{20}$ alkyl.

20. The polymerizable mixture of claim 17, wherein R' is aromatic.

21. The polymerizable mixture of claim 17, wherein $R_1$ and $R_2$ represent, independently of each other, a tetravalent aromatic radical substituted with a halogen, chalcogen, phenyl, hydroxyl, carboxyl, carbonyl, or aliphatic of less than 10 carbon atoms.

22. The polymerizable mixture of claim 17, wherein $R_1$ and $R_2$ are selected, independently of each other, from the group consisting of:

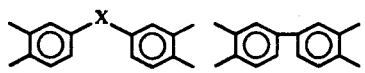

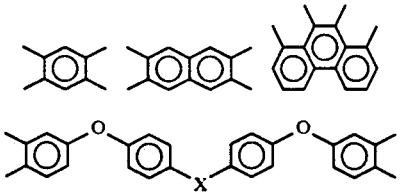

where x is

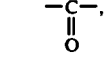

—O—, —S—,

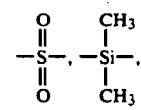

any alkyl of six carbons or fewer, any partially or perhalogenated alkyl of six carbons or fewer, or any partially or perfluorinated alkyl of six carbons or fewer.

23. The polymerizable mixture of claim 22, wherein $R_1$ and $R_2$ represent, independently of each other, a tetravalent radical of the formula:

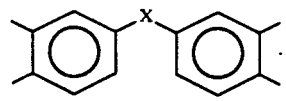

24. The polymerizable mixture of claim 23, wherein at least one of $R_1$ and $R_2$ is partially or perfluorinated alkyl.

25. The polymerizable mixture of claim 23, where X is

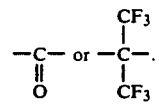

26. The polymerizable mixture of claim 17, wherein said organic nucleophilic amine curing agent is a diamine, a polyamine or an amine substituted phosphazene.

27. The polymerizable mixture of claim 26, wherein said organic nucleophilic amine curing agent is a diamine selected from the group consisting of:
o-phenylenediamine;
m-phenylenediamine;
p-phenylenediamine;
4,4'-diaminodiphenylpropane;
4,4'-diaminodiphenylmethane;
4,4'-diaminodiphenyl sulfide;
4,4'-diaminodiphenyl ether;
1,5-diaminonaphthalene;
3,3'-dimethylbenzidine;
3,3'-dimethoxybenzidine;
2,4-bis(β-amino-t-butyl)toluene;
bis(p-β-amino-t-butyl)ether;
bis(p-β-methyl-o-aminopentyl)benzene;
1,3-diamino-4-isopropylbenzene;

1,2-bis(3-aminopropoxy)ethane;
benzidine;
m-xylylenediamine;
p-xylylenediamine;
2,4-diaminotoluene;
2,6-diaminotoluene;
1,3-bis(3-aminophenoxy)benzene;
1,3-bis(4-aminophenoxy)benzene;
1,4-bis(3-aminophenoxy)benzene;
1,4-bis(4-aminophenoxy)benzene;
bissulfone;
bissulfone;
4,4'-bis(3-aminophenoxy)biphenyl;
4,4'-bis(4-aminophenoxy)biphenyl;
2,2-bispropane;
hexakis(4-aminophenoxy)cyclotriphosphazene; and
2,2-bispropane.

28. A method of producing a thermosetting phthalonitrile polymer, comprising the steps of:
heating a mixture of:

(a) an imide-containing phthalonitrile monomer having the following formula:

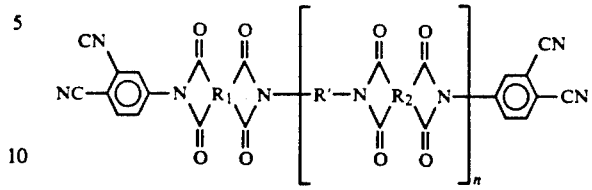

where n is an integer having a value of at least one, R' is an aliphatic or aromatic divalent radical and $R_1$ and $R_2$ represent, independently of each other, an aromatic tetravalent radical or a substituted aromatic tetravalent radical; and (b) an amount of an organic nucleophilic amine curing agent effective to cure said imide-containing phthalonitrile monomer,
above its melting or softening point.

* * * * *